United States Patent [19]
Abell et al.

[11] Patent Number: 4,605,445
[45] Date of Patent: Aug. 12, 1986

[54] UNFORTIFIED LIQUID PAPER SIZING COMPOSITION AND METHOD OF PREPARATION

[75] Inventors: Steven Abell; Thomas L. Peltier, both of Chesterfield, Mo.

[73] Assignee: Monsanto Company, St. Louis, Mo.

[21] Appl. No.: 709,625

[22] Filed: Mar. 8, 1985

[51] Int. Cl.$^4$ .................. C08J 3/02; D21D 3/00
[52] U.S. Cl. .................. 106/236; 106/238; 162/180; 260/102
[58] Field of Search .............. 106/218, 219, 236, 237, 106/238; 260/102; 162/180

[56] References Cited

U.S. PATENT DOCUMENTS

| | | | |
|---|---|---|---|
| 2,438,096 | 3/1948 | Poor et al. | 106/238 |
| 2,720,514 | 10/1955 | Rummelsburg | 260/97 |
| 2,744,889 | 5/1956 | Gayer | 260/97.5 |
| 2,941,919 | 6/1960 | Watkins | 162/180 |
| 2,985,537 | 5/1961 | Watkins | 106/238 |
| 3,400,117 | 9/1968 | D'Errico et al. | 260/97.5 |
| 3,804,788 | 4/1974 | Funaoka et al. | 106/238 |
| 4,022,634 | 5/1977 | Emerson et al. | 106/218 |
| 4,025,354 | 5/1977 | Emerson et al. | 106/218 |
| 4,093,779 | 6/1978 | Emerson et al. | 428/411 |
| 4,141,750 | 2/1979 | Emerson et al. | 106/218 |
| 4,437,894 | 3/1984 | Emerson | 106/238 |
| 4,483,744 | 11/1984 | Emerson | 162/180 |

FOREIGN PATENT DOCUMENTS

| | | |
|---|---|---|
| 31-01604 | 3/1956 | Japan . |
| 46-18283 | 5/1971 | Japan . |
| 48-48703 | 7/1973 | Japan . |
| 1048897 | 11/1966 | United Kingdom . |

Primary Examiner—Theodore Morris
Attorney, Agent, or Firm—Jon H. Beusen; William J. Farrington; Arnold H. Cole

[57] ABSTRACT

A tall oil rosin paper sizing composition comprising a homogeneous aqueous liquid which is fully miscible with water at 5° C. On a solids basis, the composition contains between about 15% and about 75% by weight of an alkali metal soap of a condensation product of tall oil rosin and an aldehyde, and between about 85% and about 25% by weight urea. Also disclosed are methods for preparation and use of the novel paper sizing composition.

23 Claims, No Drawings

UNFORTIFIED LIQUID PAPER SIZING COMPOSITION AND METHOD OF PREPARATION

BACKGROUND OF THE INVENTION

This invention relates to the field of paper sizing compositions, and particularly to an improved unfortified rosin based paper size which comprises a stable, homogeneous mobile liquid that is fully miscible with water.

Although useful as paper sizing materials, various rosins, including tall oil rosin, are relatively insoluble in water.

In order to improve their properties, rosins to be used in paper sizing are typically modified by condensation with an aldehyde, or fortified by relation with α, β unsaturated dibasic acid or anhydride such as fumaric acid, maleic acid or maleic anhydride. In accordance with currently prevailing practice, rosin sizes are usually fortified rosins. In the preparation of paper from unbleached pulp, it has generally been found that the unfortified rosins are preferred over fortified rosins.

While fortified rosin sizes are available in a number of forms, including paste, liquid, dry, and water dispersed, unfortified rosin sizes are typically available only in paste form. Such paste typically contains about 70% solids. However, to render it miscible with water and therefore useful in the sizing of paper, rosin paste must be heated to elevated temperature, typically in the range of 70°-80° C. or higher. Even at such temperatures, the degree of miscibility with water is somewhat limited. Hot compositions produced from rosin paste normally contain only up to about 12-14% by weight solids. This hot liquid composition is further diluted to 3-5% solids at ambient conditions, before being mixed with the pulp suspension. The relatively low water miscibility of unfortified rosin paste makes it expensive or impractical to convert it to liquid form for shipment, storage or handling. Accordingly, the paper maker must provide facilities for melting the paste and maintaining it in a molten form prior to use.

This melting and mixing process requires equipment and energy. It would be an advancement in the art to provide an unfortified rosin in liquid form, to facilitate handling in the paper mill, particularly in those unbleached pulp applications in which unfortified rosin size is preferred.

Emerson et al U.S. Pat. No. 4,022,634 describes a liquid sizing composition comprising an aqueous mixture of ammonia, an ammonium salt, and a fortified rosin. The fortified rosin is saponified with a base and mixed with the reaction product of urea and an acid such as sulfamic acid, phosphoric acid, oxalic acid, methanesulfonic acid, trichloracetic acid, nitric acid, sulfuric acid, hydrochloric acid, stearic acid, or acetic acid. In producing the fortified rosin, tall oil rosin is reacted with from 9-30% of an organic acidic compound.

Emerson et al U.S. Pat. No. 4,025,354 also describes an aqueous sizing composition comprising rosin and the reaction product of urea and sulfamic acid. The disclosure is further directed to sizing compositions comprising hydrocarbon resin, stearic acid, wax, or mixtures of these components with each other or with rosin.

Emerson et al U.S. Pat. No. 4,437,894 describes a paper sizing composition comprising a fortified and saponified rosin mixed with the ammonium salt of formic or sulfamic acid. The ammonium salt may be produced, for example, by the reaction of urea and formic acid.

Rummelsburg U.S. Pat. No. 2,720,514 is a relatively early patent describing treatment of tall oil rosin with an aldehyde in the presence of a strong acid catalyst to form a rosin/aldehyde condensation product. This reference is not specifically concerned with paper size.

Watkins U.S. Pat. No. 2,941,919 describes a paste size which comprises the reaction product of tall oil rosin and formaldehyde. The formaldehyde modification is said to improve sizing efficiency. The amount of formaldehyde reacted is 1-4% based on the weight of the tall oil rosin. The paste product is saponified.

Japanese Pat. No. 31[1956]-1604 describes a process in which rosin and urea are separately added to a pulp suspension to provide sizing to the paper produced from the pulp. According to the disclosure, the urea may be added at any stage of the rosin sizing process. Both the saponified rosin and urea are preferably added to the beater, i.e., the tank in which the pulp is sized and refined.

Japanese Pat. No. 48[1973]-48703 describes a sizing composition in which fortified and saponified rosin is compounded with a urea/formaldehyde resin. The purpose of the urea formaldehyde resin is to promote the solubility of the potassium soap of the rosin.

Japanese Pat. No. 46[1971]-18283 describes the preparation of a rosin-type sizing agent which is said to be effective in hard water. The sizing agent is produced by reacting fortified rosin with urea, partially saponifying the reaction product with a nitrogenous base, such as ammonia, an amine, or an alkanolamine, and further saponifying with an alkali metal base such as potassium hydroxide, sodium hydroxide, potassium carbonate, or sodium carbonate. A water miscible organic solvent such as methanol is added to the resulting composition.

SUMMARY OF THE INVENTION

Among the several objects of the present invention are the provision of a novel liquid composition useful as a paper size; the provision of a homogeneous liquid sizing composition containing a high proportion of unfortified rosin solids; the provision of such a composition which exhibits a relatively low viscosity; the provision of such a composition which comprises a stable liquid at room temperature or even below; the provision of such a composition which is particularly effective in the sizing of unbleached pulp; the provision of such a composition which is economical to produce; and the provision of methods for the preparation of homogeneous, mobile liquid paper sizing compositions of high stability.

Briefly, therefore, the present invention is directed to an unfortified rosin paper sizing composition comprising a homogeneous liquid which is fully miscible with water at 5° C. On a solids basis, the composition contains between about 15% and about 75% by weight of an alkali metal soap of a condensation product of rosin and an aldehyde, and between about 85% and about 25% by weight urea.

The invention is further directed to a process for the preparation of a homogeneous liquid composition that is adapted for paper sizing and is fully miscible with water at 5° C. In accordance with the method, molten rosin is reacted with an aldehyde in the presence of an acid catalyst to produce a condensation product of the rosin and the aldehyde. This condensation product is saponified with an alkali metal base to produce an aqueous mixture comprising the saponified condensation product. And, urea is added to the aqueous mixture in a proportion sufficient to enhance the solubility of the saponified condensation product in the mixture. The invention is further directed to the product of this process.

Other objects and features will be in part apparent and in part pointed out hereinafter.

DESCRIPTION OF THE PREFERRED EMBODIMENTS

Because tall oil rosin is the rosin most widely used in paper sizing, this invention will be described in terms of tall oil rosin, however, other rosins, such as gum rosin or wood rosin can also be used.

In accordance with the present invention, a paper sizing composition is provided which comprises an unfortified tall oil rosin in stable, homogeneous, concentrated liquid form. Thus, it has been found that by adding urea to an aqueous mixture containing unfortified tall oil rosin that has been modified by condensation with formaldehyde and saponified with an alkali metal base, the solubility and/or dispersibility of the unfortified rosin is substantially enhanced. By incorporation of the appropriate amounts of urea after saponification of the rosin/aldehyde condensation product, a homogeneous liquid is produced which is stable over a wide range of temperatures, even at relatively high solids content. Moreover, the concentrated product is a mobile liquid which typically exhibits a viscosity of less than 1000 centipoise (cp) at ambient temperature. The liquid sizing composition is completely and fully miscible with water, not only at normal ambient temperatures, but at temperatures as low as 5° C. In the preparation of this novel sizing composition by the process of the invention, rosin is initially condensed with an aldehyde such as, for example, formaldehyde, acetaldehyde, or proprionaldehyde. Preferably, formaldehyde is used for modification of the rosin.

To carry out the condensation reaction, molten tall oil rosin is reacted with the aldehyde in the presence of a strong acid catalyst at a temperature of preferably between about 150°–170° C. Suitable acid catalysts include, but are not limited to, toluene sulfonic acid, benzene sulfonic acid, or a mineral acid such as phosphoric acid or sulfuric acid. Without intending to be bound by the theory, it is believed that the acid catalyst promotes isomerization of the rosin acids to levopimaric acid, the form which most readily condenses with the aldehyde. The aldehyde reactant is added to the reaction system in the proportion which is preferred in the final product, i.e., between about 0.4 and 0.8 moles per mole of molten rosin. The catalyst concentration is not critical but may typically range between about 0.05% and about 2% based on the total weight of reactants charged to the system.

Formaldehyde may be charged to the reaction in any of a variety of forms. Conveniently, it is introduced either as paraformaldehyde powder or as a solution of formaldehyde in water (formalin). Alternatively, it may be introduced in the form of a cyclic oligomer such as trioxane, or even as formaldehyde gas. Where other aldehydes are used, they may also be introduced in any of the monomeric or polymeric forms in which they may be available.

After the condensation reaction is complete, the aldehyde modified rosin is saponified by reaction with an alkali metal base, thereby producing an aqueous liquid mixture containing the saponified condensation product. Of the base reacted with the modified rosin in the saponification, preferably at least about 95 mole percent comprises a potassium base such as potassium hydroxide or potassium carbonate. Where more than 5% of the alkali metal introduced by saponification comprises sodium, the stability of the composition as a homogeneous liquid may not be completely satisfactory.

Conveniently, a 25 to 50% by weight aqueous solution of KOH may be used for the saponification. The saponification proceeds effectively at temperatures of about 80° C. and above. Preferably, at least about 94–95% of the rosin acid carboxyl groups are neutralized. The extent of neutralization is best expressed in terms of the acid number of the saponified composition, defined as the number of milligrams of KOH per gram of modified rosin product that would be necessary to achieve 100% neutralization of the rosin carboxyl groups. Acid number is determined on the final product, after urea addition, adjusted to 50% solids. The acid number may be determined by the following procedure: (1) mix the sample (1 g) with n-propanol (50 ml) and deionized water (50 ml); (2) add 6 drops of phenolphthalein (0.5% in alcohol/water) to the mixture and stir it until the rosin sample is fully dissolved; and (3) titrate to a pink color end point with 0.1N NaOH. If the modified rosin product contains an excess of base, the solution may turn pink immediately upon addition of phenolphthalien in Step (2). If this occurs, an aliquot of HCl is added (usually 10 ml of 0.1N HCl), and titration is continued as in Step 3. Such an excess of KOH will result in a negative acid number. The acid number (A.N.) may then be calculated from the algorithm:

$$A.N. = \frac{[(ml\ NaOH \times normality) - (ml\ HCl \times normality)] \times 56.1}{weight\ sample\ (g)}$$

Expressed in this manner, the desired extent of neutralization is reflected by an acid number of between about −5 and about 5. Although the composition may be an effective paper sizing agent outside this acid number range, the product produced within this range is a clear solution, which has a more desirable appearance than a cloudy solution, which can result outside of this acid number range. To facilitate quality control in the process of manufacture, it is convenient to maintain the acid number between about 1 and about 5.

In carrying out the reaction, it is preferred that the acid number of the aldehyde-modified rosin be determined prior to neutralization, and that an amount of alkali metal base necessary to neutralize a high proportion, for example, 85–90% of the acid groups, be initially charged to the system containing the aldehyde modified rosin. Thereafter, the acid number may once again be determined and an additional amount of base may be added to reach the desired end point.

Although urea may be added at various points in the process, it is strongly preferred that the urea be added to an aqueous mixture comprising the aldehyde-modified rosin after saponification. Preferably, the aqueous mixture containing the saponified rosin-aldehyde condensation product is cooled to a temperature below 100° C. before addition of urea. By deferring the addition of urea until after saponification, it is believed that any reaction between the urea and the rosin-aldehyde condensation product is substantially avoided. In any event, this sequence of addition has been found to assure maximum stability. If, instead, the urea is added before saponification, a jelly-like or stringy mass may be formed within the composition.

It has been found that balanced proportions of urea significantly enhance the water miscibility and, in particular, the stability of the liquid composition, particularly at high rosin solids content. Although aldehyde modification and saponification promote solubility of the rosin, these measures are not sufficient to provide a stable homogeneous liquid. Solubility is particularly difficult to achieve at rosin solids concentrations of greater than about 25% by weight; and even at lower solids concentrations solutions of the saponified rosin-aldehyde condensation product tend to be unstable, becoming cloudy and stringy upon standing. However, it has been discovered that, by proper additions of urea, stable liquid compositions can be provided at rosin solids concentrations up to 35% by weight and even somewhat higher.

On a solids basis, the compositions of the invention contain between about 25% and 85% by weight urea, and between about 75% and about 15% by weight saponified rosin-aldehyde condensation product. To minimize the expense of handling and shipping, it is preferred that at least 25% by weight of the liquid composition comprise the alkali metal soap of the condensation product, i.e., that the rosin soap be present on a proportion of at least 25% by weight on a total composition (wet) basis. At these rosin solids levels and above, at least about 10% by weight urea (wet basis) is necessary to enhance solubility and impart stability. However, excessive concentrations of urea may actually depress rosin solubility at high rosin solids content. Preferably, urea is charged to the aqueous mixture in a proportion of between about 10% and about 40% by weight, more preferably about 12% to about 20% by weight, optimally about 14% to about 16% by weight. Maximum attainable concentration of the alkali metal soap of the rosin-aldehyde condensation product in a homogeneous liquid product is about 40% by weight. Water content should be at least about 40% by weight.

The product of the invention, as prepared in the manner described above, comprises a brown, mobile liquid of high stability, i.e., it is a homogeneous and clear solution adapted to be mixed with water at room temperature or higher. In fact, the sizing composition of the invention remains homogeneous and infinitely miscible with water at temperatures as low as 5° C., or in some instances even lower. The composition has viscosity of less than 1000 cp at 25° C. More preferably, the viscosity at 25° C. is less than about 500 cp, typically between about 225 to about 350 cp.

This composition is storage stable over a wide temperature range. However, storage at elevated temperatures can cause the urea to break down, producing ammonia and carbon dioxide, which can result in reduced solubility of the rosin product. As a result, storage at elevated temperatures, particularly above 150° F., should be avoided.

The composition of the invention is preferably used as an internal size, though it may also be applied as a surface size if desired. In use as an internal size, the composition of the invention is diluted with water and added to a pulp suspension. Aluminum sulfate (papermaker's alum) can be added to the suspension prior to, simultaneously with, or subsequent to the size composition. As indicated above, the composition of the invention is particularly effective for sizing of unbleached fiber, most particularly unbleached kraft paper. For this purpose it is believed to be superior to fortified rosin sizing compositions, and is believed to be equivalent to, and in some instances superior to, a similar quantity (on a rosin solids basis) of unfortified saponified rosin applied as a paste. Generally, the sizing composition of the invention may also be produced at lower cost per unit rosin solids than liquid fortified rosin compositions.

The following examples illustrate the invention.

EXAMPLE 1

Toluene sulfonic acid (0.68 g) and paraformaldehyde (27.25 g) were charged to a pot containing molten rosin (545 g) at 140° C. The rosin had an acid number of 168. Reaction was carried out for a period of 25 minutes, while the reaction mass was heated to 180° C. At this point, the catalyst was inactivated by the addition of potassium hydroxide. The reaction mass was then neutralized by the addition of further potassium hydroxide and water. Urea and water were added to the saponified mixture at a temperature of 98° C. Additional water was added to bring the total solids level to 44.4%. The product was a stable, brown, mobile liquid having an acid number of 0.

EXAMPLE 2

Toluene sulfonic acid (0.75 g) and paraformaldehyde (29.85 g) were added to a pot containing molten rosin (597 g) having an acid number of 168. Prior to introduction of the paraformaldehyde, the molten rosin was at a temperature of 170° C. The paraformaldehyde and toluene sulfonic acid were added after the molten rosin had been cooled to about 140° C. Reaction was carried out in this mixture for a period of 30 minutes, while the reaction mass was heated to 180° C. At this point, the catalyst was inactivated and the reaction product saponified by addition of aqueous potassium hydroxide. Urea and water were thereafter added to the saponified mixture to produce a stable, brown, mobile liquid product having a solids content of 49.5% and an acid number of 0.

EXAMPLE 3

Toluene sulfonic acid (0.64 g) and paraformaldehyde (25.5 g) were charged to a pot containing molten rosin (510 g). The rosin used in this instance had an acid number of 178 and was initially charged to the pot at a temperature of 175° C. The paraformaldehyde and toluene sulfonic acid were added after cooling the molten rosin to 150° C. Reaction was carried out in this mixture for a period of 35 minutes, by which time the temperature of the reaction mass had increased to 200° C. At this point, the catalyst was inactivated and the reaction product saponified by addition of aqueous potassium hydroxide. Urea and water were thereafter added to the saponified mixture to produce a final product comprising a stable, brown, mobile liquid having a solids content of 47.6% and an acid number of 3.4.

EXAMPLE 4

A series of reactions were carried out in which rosin was reacted with varying proportions of formaldehyde. In each instance, toluene sulfonic acid and formaldehyde were charged to a pot containing molten rosin.

Reaction proceeded as in the preparations of Example 1–3 and the resulting rosin formaldehyde condensation product was saponified with aqueous potassium hydroxide, after which urea was added to the mixture. Set forth in Table I are the proportions of reactants, reaction conditions, and the characteristics of the products obtained in each of the preparations of this example.

TABLE I

|  | 4A | 4B | 4C |
|---|---|---|---|
| Formaldehyde charge: | | | |
| weight (g) | 21.2 | 31.35 | 41.28 |
| based on rosin (% by weight) | 4 | 6 | 8 |
| TSA charge (g) | 0.66 | 0.65 | 0.65 |
| Rosin Charge (g) | 530 | 523 | 516 |
| Temperature: | | | |
| begin formaldehyde addition (°C.) | 145 | 150 | 150 |
| after formaldehyde addition (°C.) | 155 | 145 | 150 |
| final reaction mass (°C.) | 180 | 175 | 180 |
| Condensation Reaction Time (min) | 30 | 20 | 30 |
| Product characteristics: | | | |
| solids (% by weight) | 49.6 | 49.3 | 50.0 |
| acid number | 1.3 | 1.7 | 0 |
| viscosity at 23° C. | 326 | 250 | 245 |

EXAMPLE 5

The product produced in Example 4B, above, was used to produce paper, using a mixture of about 90% unbleached kraft softwood pulp and about 10% unbleached kraft hardwood pulp, with a Canadian Standard Freeness of 600 ml. The headbox pH was 5.5, and the machine was set to produce paper with a basis weight of 40 lbs per 3000 sq. ft. The modified rosin product of 4B was used as an internal size at the rate indicated (expressed as dry lbs of dissolved solids per ton of dry paper pulp), along with 30 lbs of alum per ton of dry paper pulp. Sizing effectiveness was evaluated using a Hercules Size Tester, using No. 2 ink, with the end point set at 80% of original reflectance, with the results reported in seconds. Since the test measures the time necessary for ink to penetrate the paper, a longer time is better. The results reported in Table II are comparable to those resulting from use of unfortified paste size considered on a rosin solids basis.

TABLE II

| Size Usage (dry lbs/ton of pulp) | Sizing Effectiveness (seconds) |
|---|---|
| 1 | 18 |
| 2 | 87 |
| 3 | 176 |

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A rosin paper sizing composition comprising a homogeneous aqueous liquid which is fully miscible with water at 5° C., on a solids basis said composition containing between about 15% and about 75% by weight of an alkali metal soap of a condensation product of rosin and aldehyde, and between about 85% and 25% by weight urea.

2. A composition as set forth in claim 1 wherein the rosin is tall oil rosin.

3. A composition as set forth in claim 2 comprising on the basis of the total composition between about 25% and about 40% by weight of said soap and between about 10% and about 40% by weight urea.

4. A composition as set forth in claim 2 having a viscosity of not greater than 1000 cp at 25° C.

5. A composition as set forth in claim 1 wherein said aldehyde is selected from the group consisting of acetaldehyde and formaldehyde.

6. A composition as set forth in claim 2 wherein said condensation product is produced by reaction of tall oil rosin and between about 0.4 and about 0.8 moles of aldehyde per mole of rosin acids.

7. A composition as set forth in claim 6 wherein said aldehyde comprises formaldehyde.

8. A composition as set forth in claim 1 having an acid number of between about −5 and about 5.

9. A composition as set forth in claim 8 wherein said alkali metal base is selected from the group consisting of sodium hydroxide, potassium hydroxide, sodium carbonate, and potassium carbonate.

10. A composition as set forth in claim 9 wherein a potassium base comprises at least about 95 mole percent of the base reacted with said condensation product in the saponification thereof.

11. A tall oil rosin paper sizing composition comprising a homogeneous aqueous liquid which is fully miscible with water at 5° C., with an acid number from about −5 to about 5, with a viscosity not greater than 1000 cp at 25° C., comprising, on a 100% basis:
  a. at least about 40% by weight water;
  b. from about 25% to about 40% by weight of a potassium soap of a condensation product of tall oil rosin and formaldehyde; and
  c. from about 10% to about 40% by weight of urea.

12. A process for the preparation of a liquid paper sizing composition comprising the steps of:
  a. reacting molten rosin with an aldehyde in the presence of an acid catalyst to produce a condensation product of the rosin and the aldehyde;
  b. saponifying said condensation product with an alkali metal base to produce an aqueous mixture comprising the saponified condensation product; and
  c. adding urea to said mixture in a proportion sufficient to enhance the water solubility and stability of the mixture.

13. The process as set forth in claim 12 in which the rosin is tall oil rosin.

14. A process as set forth in claim 13 wherein the rosin, aldehyde, base, urea and water are mixed in proportions such that the product of the process contains between about 25% and about 40% by weight of the saponified condensation product of rosin and aldehyde, and between about 10% and about 40% urea.

15. A process as set forth in claim 12 wherein said catalyst comprises an aryl sulfonic acid.

16. A process as set forth in claim 15 wherein said catalyst comprises p-toluenesulfonic acid.

17. A process as set forth in claim 12 wherein between about 0.4 and about 0.8 moles of aldehyde are reacted per mole of rosin acids in the preparation of said condensation product.

18. A process as set forth in claim 12 wherein said alkali metal base is selected from the group consisting of sodium hydroxide, potassium hydroxide, sodium carbonate, and potassium carbonate.

19. A process as set forth in claim 18 wherein a potassium base comprises at least about 95 mole percent of the base reacted with said condensation product in the saponification thereof.

20. A process as set forth in claim 12 wherein the urea is added to said mixture after the saponification of said condensation product.

21. A process for the preparation of a liquid paper sizing composition, comprising the steps of:
 a. reacting molten tall oil rosin with from about 0.4 to about 0.8 moles of formaldehyde per mole of rosin acid, to produce a condensation product;
 b. saponifying said condensation product with a alkali metal base comprising at least about 95% potassium base, to product an aqueous mixture containing the saponified condensation product, and
 c. thereafter, adding urea in a proportion sufficient to produce a homogeneous liquid which is fully miscible with water at 5° C.

22. A tall oil rosin paper sizing composition comprising a homogeneous aqueous liquid which is fully miscible with water at 5° C., said composition being produced by the process comprising:
 a. reacting molten tall oil rosin with an aldehyde in the presence of an acid catalyst to produce a condensation product of the rosin and the aldehyde;
 b. saponifying said condensation product with an alkali metal base to produce an aqueous mixture comprising the saponified condensation product; and
 c. adding urea to said mixture in a proportion sufficient to enhance the solubility of the saponified condensation product in said mixture.

23. A method for sizing paper comprising introducing into an aqueous suspension of pulp, a tall oil rosin based sizing agent and sulfate alum to deposit said sizing agent on the surfaces of the pulp fibers, said sizing agent comprising a homogeneous aqueous liquid which is fully miscible with water at 5° C., on a solids basis said composition containing between about 15% and about 75% by weight of an alkali metal soap of a condensation product of tall oil rosin and an aldehyde, and between about 85% and 25% by weight urea.

* * * * *